(12) United States Patent
Ito et al.

(10) Patent No.: US 8,944,255 B2
(45) Date of Patent: Feb. 3, 2015

(54) CHUTE FOR OPTICAL SORTING MACHINE

(75) Inventors: Takafumi Ito, Tokyo (JP); Tomoyuki Miyamoto, Tokyo (JP)

(73) Assignee: Satake Corporation, Tokyo (JP)

( * ) Notice: Subject to any disclaimer, the term of this patent is extended or adjusted under 35 U.S.C. 154(b) by 0 days.

(21) Appl. No.: 14/234,391

(22) PCT Filed: Jul. 20, 2012

(86) PCT No.: PCT/JP2012/004622
§ 371 (c)(1),
(2), (4) Date: Jan. 23, 2014

(87) PCT Pub. No.: WO2013/031079
PCT Pub. Date: Mar. 7, 2013

(65) Prior Publication Data
US 2014/0166549 A1    Jun. 19, 2014

(30) Foreign Application Priority Data

Aug. 26, 2011  (JP) .................................. 2011-185106

(51) Int. Cl.
| | | |
|---|---|---|
| B07C 1/00 | (2006.01) | |
| B65G 11/02 | (2006.01) | |
| B07C 5/02 | (2006.01) | |
| B07C 5/342 | (2006.01) | |
| B65G 11/08 | (2006.01) | |

(52) U.S. Cl.
CPC ............. *B65G 11/023* (2013.01); *B07C 5/02* (2013.01); *B07C 5/3425* (2013.01); *B65G 11/083* (2013.01); *B07C 5/342* (2013.01); *B07C 2501/0018* (2013.01)
USPC ............ 209/655; 209/644; 209/576; 209/707

(58) Field of Classification Search
USPC .................................. 209/576, 644, 655, 707
See application file for complete search history.

(56) References Cited

U.S. PATENT DOCUMENTS

2010/0096300 A1    4/2010  Mills et al.

FOREIGN PATENT DOCUMENTS

| JP | S59-124606 A | 7/1984 |
|---|---|---|
| JP | 2010-142678 A | 7/2010 |

*Primary Examiner* — Terrell Matthews
(74) *Attorney, Agent, or Firm* — Joseph P. Farrar, Esq.

(57) ABSTRACT

A chute for an optical sorting machine allows objects to be sorted to drop under gravity from the lower end of the chute, thereby supplying the objects to an optical detection section. The chute is provided with: a first portion which includes a portion for receiving the objects to be sorted which are supplied from a supply section; and a second portion which continues from the first portion. The first portion is composed of a single part and has: flat surfaces along which the objects to be sorted flow down; and connection surfaces. The flat surfaces located upstream are bent downward and the connection surfaces located downstream are bent upward to form a smooth undulation in the surface along which the objects to be sorted flow down.

4 Claims, 9 Drawing Sheets

CHUTE FOR OPTICAL SORTING MACHINE

TECHNICAL FIELD

The present invention relates to an optical sorting machine for sorting out granular articles such as grains and plastic pellets on the basis of colors or the like, and particularly relates to a chute used for the optical sorting machine.

BACKGROUND ART

Conventionally, an optical sorting machine is known for sorting out raw material composed of grains such as rice, barley, wheat, oats, beans and nuts, plastic pieces such as pellets and beads, fine articles such as drugs, ores and volcanic soil, or other granular articles into good articles or defective articles and/or excluding foreign objects and the like contaminating the raw material.

Optical sorting machines of this kind include one of the type in which a chute with a predetermined width is inclined and disposed on the downside of a granular article feeding part.

The optical sorting machine sorts out the granular articles by: feeding a large amount of granular articles to the chute having the predetermined width from the granular article feeding part; irradiating, with light, the granular articles which flow down the chute surface, spreading in the width direction, and which undergo free fall along a predetermined path from the lower end of the chute; receiving the reflected light and the like from the granular articles to detect defective articles, foreign objects and the like contained in the raw material; and excluding the detected defective articles, foreign objects and the like from the predetermined path.

Incidentally, in the above-mentioned optical sorting machine, when the raw material is granular articles with long and thin shapes such as long grain rice, granular articles with viscosity on the surfaces such as parboiled rice, or the like, the plural granular articles overlapping with and/or being joined to one another are liable to cause unevenness of the flow of the granular articles on the chute surface. As a result, there has been a problem that failure in detection of defective articles and the like, and/or failure in exclusion, for example, exclusion of good articles mixed up with the defective articles can arise.

Therefore, as for the optical sorting machines, a chute for preventing unevenness of the flow of granular articles is proposed (see Patent Literature 1).

Figure 7:
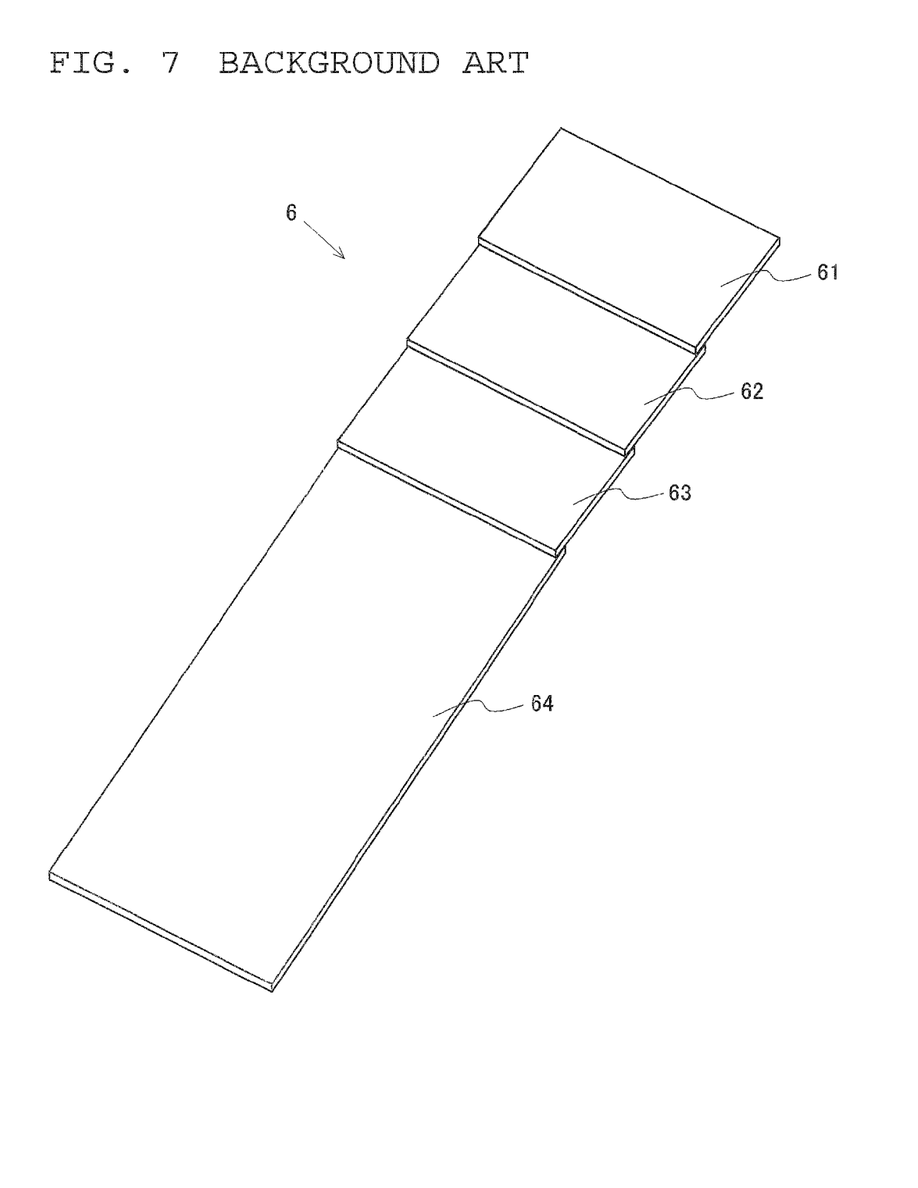
FIG. 7 is a schematic diagram of a conventional chute.
Figure 8:
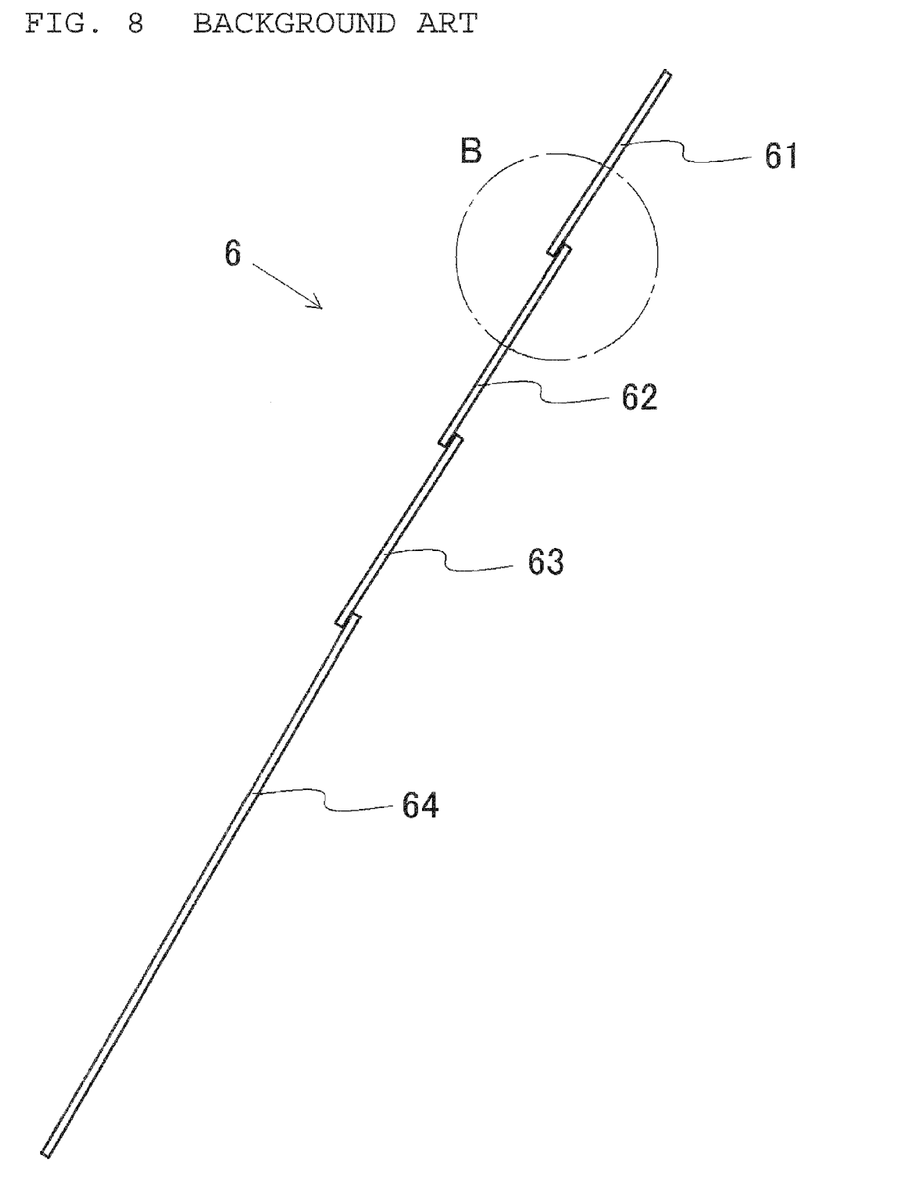
FIG. 8 is a lateral view of the chute in FIG. 7.
Figure 9:
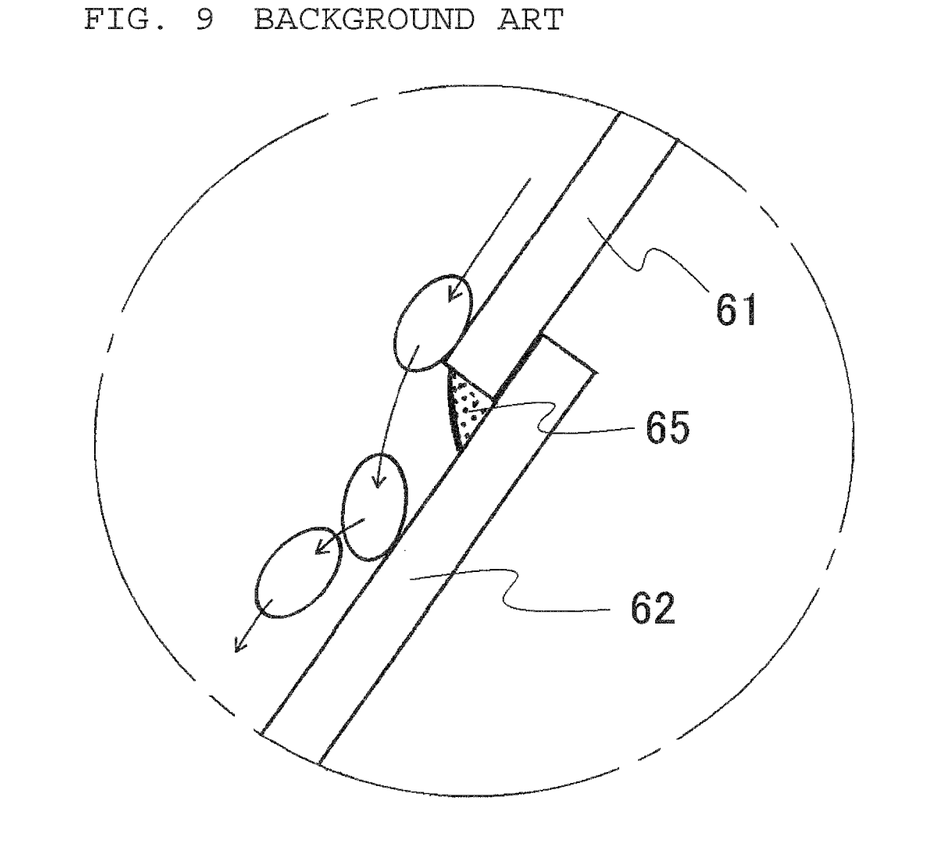
FIG. 9 is an enlarged view of the B part in FIG. 8.

FIG. 7 shows a schematic diagram for explaining the chute disclosed in Patent Literature 1, FIG. 8 shows a lateral view of the chute shown in FIG. 7. Moreover, FIG. 9 shows an enlarged view of the B part in FIG. 8.

A chute 6 disclosed in Patent Literature 1 includes components 61 to 64 composed of a plurality of plate shapes with flat surfaces.

In the chute 6, the downstream side end part of the component that positions on the upstream side is overlapped with the upstream side end part of the component that positions on the downstream side sequentially, and thereby, the flat surfaces of the plurality of components 61 to 64 are assembled with the steps included to form the surface which granular articles flow down.

According to the above-mentioned chute 6, since the granular articles disperse due to the impacts in dropping over the steps, unevenness of the flow of the granular articles on the chute surface can be prevented.

However, in the above-mentioned chute 6, as shown in FIG. 9, since the granular articles dropping over the step are liable to cause hops thereof, a problem arises that the flow of the granular articles is hardly stabilized on the surface of the component that positions on the downstream side.

Moreover, in the above-mentioned chute 6, since powdery dusts are liable to swirl when the granular articles are dropping over the steps and there is a risk that powdery dusts sticking and deposited on the step part contaminate the granular articles as foreign objects, the step part is needed to be cleaned periodically.

CITATION LIST

Patent Literature

Patent Literature 1 U.S. Patent Application Publication No. 2010/0096300

SUMMARY OF THE INVENTION

Technical Problem

Therefore, an object of the present invention is to provide a chute which does not cause hops of granular articles and deposition of powdery dusts and which can prevent unevenness of the flow of granular articles on the surface.

Moreover, an object of the present invention is to provide an optical sorting machine including a chute which does not cause hops of granular articles and deposition of powdery dusts and which can prevent unevenness of the flow of granular articles on the surface.

Solution to the Problem

In order to achieve the above-mentioned objects, the present invention is characterized in a chute for an optical sorting machine, the chute: receiving a sorted article fed from a feeding part; allowing the received sorted article to flow down a surface; and after that, allowing the sorted article to undergo free fall from a lower end and to be fed to an optical detecting part, the chute including: a first part including a part for receiving the sorted article fed from the feeding part; and a second part succeeding the first part and allowing the sorted article to undergo free fall from the lower end, wherein the first part is composed of one component, the first part has: a plurality of flat surfaces which the sorted article flows down; and a joint plane joining the plurality of flat surfaces at an obtuse angle in a direction in which the sorted article flows down, the joint plane is configured by bending the flat surface that positions on an upstream side downward and the flat surface that positions on a downstream side is configured by bending the joint plane upward, and thereby, a smooth undulation is formed on the surface which the sorted article flows down.

In addition, regarding the chute according to the present invention, it is preferable that the joint planes are formed such that their slopes are less than 90 degrees when they are disposed in the optical sorting machine.

Regarding the chute according to the present invention, it is preferable that, while having the joint plane at a lower end of the first part, the first part is detachably attached to a chute body including the second part and is smoothly succeeded by the second part via the joint plane included at the lower end by being attached to the chute body.

Regarding the chute according to the present invention, it is preferable that the first part and the second part are integrally formed of one component.

The present invention is characterized in an optical sorting machine including: a chute: receiving a sorted article fed from a feeding part; and allowing the received sorted article to flow down a surface; optical detecting means for detecting the sorted article in free fall from a lower end of the chute at a predetermined detecting position; and ejector means for sorting out the sorted article on the basis of a detection result of the optical detecting means, wherein the chute includes: a first part including a part for receiving the sorted article fed from the feeding part; and a second part succeeding the first part and allowing the sorted article to undergo free fall from the lower end, the first part is composed of one component, the first part has: a plurality of flat surfaces which the sorted article flows down; and a joint plane joining the plurality of flat surfaces at an obtuse angle in a direction in which the sorted article flows down, the joint plane is configured by bending the flat surface that positions on an upstream side downward and the flat surface that positions on a downstream side is configured by bending the joint plane upward, and thereby, a smooth undulation is formed on the surface which the sorted article flows down.

Advantageous Effects of the Invention

According to the chute of the present invention, since sorted articles disperse due to the impacts in their movements from the flat surface that positions on the upstream side to the flat surface that positions on the downstream side, unevenness of the flow of the sorted articles on the chute surface can be prevented.

Moreover, since, in the first part of the chute according to the present invention, smooth undulations are formed on the surface which the sorted articles flow down and the sorted articles move between the plurality of flat surfaces with moderate impacts, hops of the sorted articles hardly arise on the first part.

Furthermore, in the chute according to the present invention, since the first part is composed of one component and the continuity of the component is maintained, deposition of powdery dusts does not arise on the first part.

Regarding the chute according to the present invention, when, while having the joint plane at a lower end of the first part, the first part is detachably attached to a chute body including the second part and is succeeded by the second part via the joint plane included at the lower end by being attached to the chute body, the first part can be properly modified according to the sizes, kind and the like of the sorted articles.

Moreover, in that case, in the chute according to the present invention, since the first part can be detachable, the first part and the chute body can be cleaned easily.

Furthermore, in the chute according to the present invention, when the plural sorted articles are granular articles such as short grain rice without a risk that they overlap with and/or are joined to one another, the first part can be detached in the usage.

Moreover, regarding the chute according to the present invention, when the surface of the joint plane included at the lower end is smoothly succeeded by the surface of the second part without a step in attaching the first part to the chute body, the sorted articles can move between the flat surface that positions on the most downstream side of the first part and the surface of the second part with moderate impacts, and thus, hops of the sorted articles and deposition of powdery dusts hardly arise.

Regarding the chute according to the present invention, when the first part and the second part are integrally composed of one component, since the continuity of the component is maintained, the sorted articles can move smoothly between the surface of the first part and the surface of the second part and hops of the sorted articles and deposition of powdery dusts do not arise.

According to the optical sorting machine of the present invention, since sorted articles flowing down the chute surface disperse due to the impacts in the movements from the flat surface that positions on the upstream side to the flat surface that positions on the downstream side, unevenness of the flow of sorted articles on the chute surface can be prevented.

Moreover, since, in the first part of the chute in the optical sorting machine according to the present invention, smooth undulations are formed on the surface which the sorted articles flow down and the sorted articles move with moderate impacts between the plurality of flat surfaces, hops of the sorted articles hardly arise on the first part.

Furthermore, in the chute of the optical sorting machine according to the present invention, since the first part is composed of one component and the continuity of the component is maintained, deposition of powdery dusts does not arise on the first part.

DESCRIPTION OF EMBODIMENTS

Figure 1:
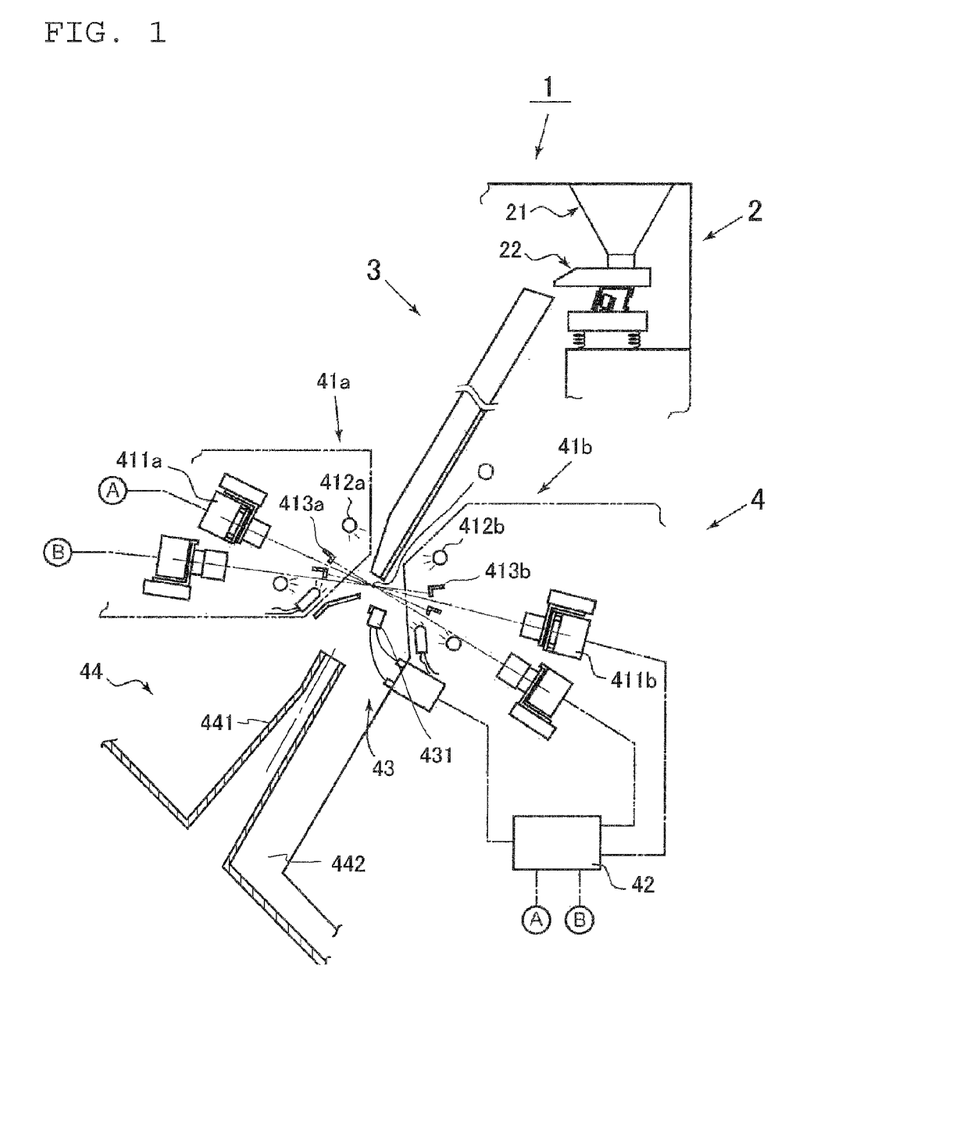
FIG. 1 is a lateral cross-sectional view of an internal structure of an optical sorting machine.

Embodiments according to the present invention will be described with reference to the drawings.
<Optical Sorting Machine>
FIG. 1 is one example of an optical sorting machine using a chute according to the present invention and shows a simplified lateral cross-sectional view of the internal structure of the optical sorting machine.

An optical sorting machine 1 shown in FIG. 1 includes a granular article feeding part 2, a chute 3 and an optical sorting part 4.

The granular article feeding part 2 is disposed in the upper part of the optical sorting machine 1 and includes a tank 21 and a vibratory feeder 22 for feeding granular articles in the tank 21.

The chute 3 has a predetermined width and is disposed inclining on the downside of the granular article feeding part 2.

A large amount of granular articles continuously fed from the vibratory feeder 22 of the granular article feeding part 2 continuously flow down the surface of the chute 3 on the basis of the action of gravity, spreading in the width direction, and after that, are allowed in free fall along a predetermined path from the lower end of the chute 3.

The optical sorting part 4 includes: a pair of optical detectors 41a and 41b arranged in front of and behind the falling path of the granular articles; a discriminating device 42 for judging the granular articles to be good articles or defective articles on the basis of imaging signals of the optical detectors 41a and 41b; an ejector 43 for excluding the defective articles on the basis of the judgment results of the discriminating device 42 to sort out the granular articles into the good articles or the defective articles; and a discharge hopper 44 for discharging the granular articles sorted out into the good articles or the defective articles by the ejector 43.

Herein, the optical detectors 41a and 41b contain line sensors and/or area sensors such as CCDs operable for granular articles in free fall which are spreading from the lower end of the chute 3 in the width direction, and they respectively include: imaging means 411a, 411b such as CCD cameras capable of receiving light with a wavelength range of NIR (near-infrared light), visible light, ultraviolet light or the like; illumination means 412a, 412b such as fluorescent lamps, halogen lamps and LED light sources for illuminating a detecting position O on the falling path of the granular articles; and backgrounds 413a and 413b as the backgrounds in imaging the granular articles at the detecting position O with the imaging means.

Moreover, similarly to the optical detectors 41a and 41b, the ejector 43 is operable for granular articles in free fall which are spreading from the lower end of the chute 3 in the width direction, and includes a nozzle 431 from whose plural nozzle holes formed in the width direction the air can be selectively ejected.

In the above-mentioned optical sorting machine 1, the granular articles stored in the tank 21 of the granular article feeding part 2 are continuously fed to the chute 3 via the vibratory feeder 22, are allowed to undergo continuous free flow-down on the surface of the chute 3 in the state of spreading in the width direction, and after that, are allowed to undergo free fall from the lower end of the chute 3 along a predetermined path.

The granular articles in free fall are imaged at the detecting position O on the falling path by the imaging means 411a, 411b of the pair of optical detectors 41a and 41b in the optical sorting part 4.

The granular articles imaged by the imaging means 411a, 411b are compared with thresholds regarding the signal levels of the imaging signals in light amount and color components by the discriminating device 42, and judged to be any of the good articles and the defective articles.

Then, the granular articles are sorted out into the good articles or the defective articles, the defective articles excluded from the predetermined falling path with the air ejected by the ejector 43 on the basis of exclusion signals sent from the discriminating device 42. The good articles and the defective articles are discharged from a good article discharge chute 441 and a defective article discharge chute 442 of the discharge hopper 44, respectively.

Incidentally, the optical sorting machine using the chute according to the present invention only has to include: a feeding part for feeding granular articles to the chute; optical detecting means for detecting the granular articles in free fall from the chute lower end; and ejector means for excluding and sorting out specific granular articles on the basis of the detection results of the optical detecting means. Specific configurations of the feeding part, the optical detecting means and the ejector means are not limited to those mentioned above.

<Chute>

Figure 2:
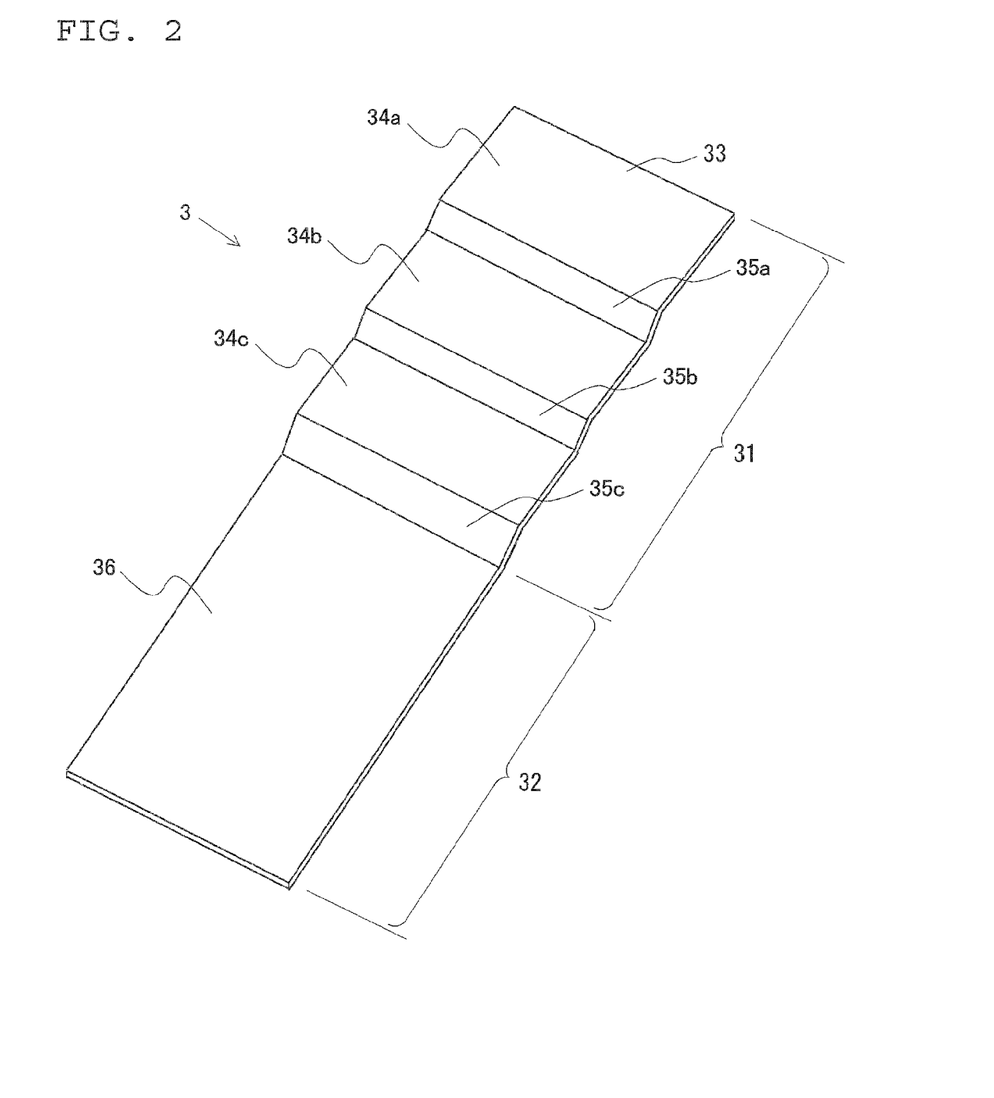
FIG. 2 is a schematic diagram of a chute according to an embodiment of the present invention.
Figure 3:
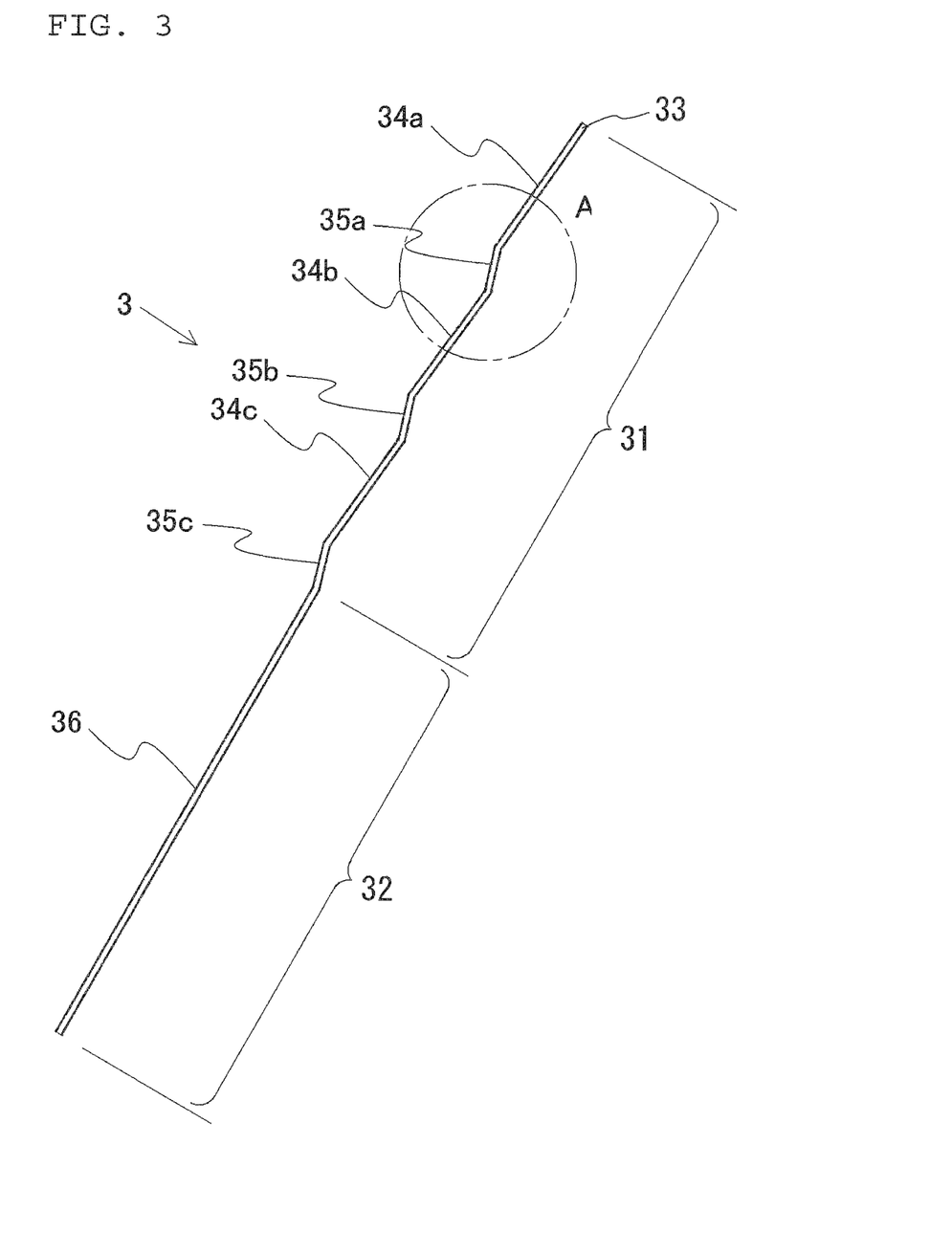
FIG. 3 is a lateral view of the chute in FIG. 2.
Figure 4:
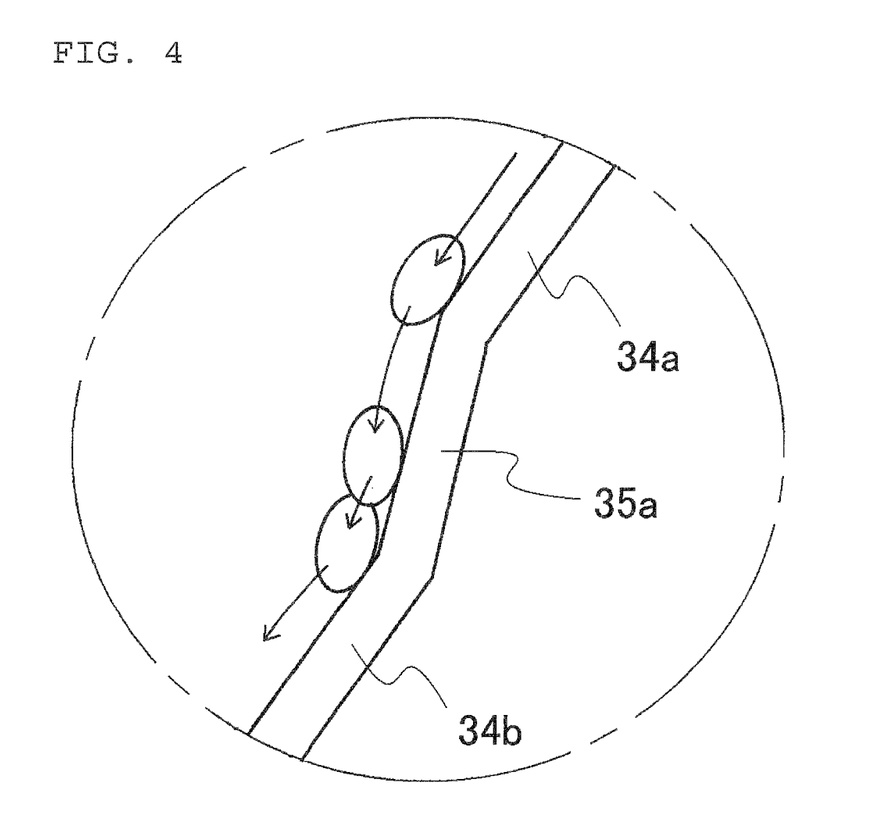
FIG. 4 is an enlarged view of the A part in FIG. 3.

FIG. 2 shows a schematic diagram for explaining a chute according to the embodiment of the present invention. FIG. 3 shows a lateral view of the chute shown in FIG. 2. Moreover, FIG. 4 shows an enlarged view of the A part in FIG. 3.

The chute 3 according to the embodiment includes: a first part 31 including a part for receiving the granular articles fed from the vibratory feeder 22 of the granular article feeding part 2 in the optical sorting machine 1; and a second part 32 which succeeds the first part 31, allows the granular articles received by the first part 31 to flow down the surface, and after that, allows them to undergo free fall from the lower end.

As shown in FIG. 2 and FIG. 3, the cute 3 according to the embodiment is formed, for example, by processing a plate material composed of one component such as a stainless steel plate having a flat surface by means of a press or the like.

The first part 31 has a plurality of flat surfaces 34a to 34c which the granular articles flow down and a plurality of joint planes 35a to 35c joining the plurality of flat surfaces at obtuse angles in the direction in which the granular articles flow down.

Specifically, in the first part 31, the first joint plane 35a is formed by bending the downstream side end part of the first flat surface 34a positioning on the upstream side downward, and the second flat surface 34b is formed by bending the downstream side end part of the first joint plane 35a upward. Moreover, the second joint plane 35b is formed by bending the downstream side end part of the second flat surface 34b downward, and the third flat surface 34c is formed by bending the downstream side end part of the second joint plane 35b upward. Furthermore, the third joint plane 35c is formed by bending the downstream side end part of the third flat surface 34c downward.

Then, in the chute 3 according to the embodiment, the downstream side end part of the third joint plane 35c is succeeded by a flat surface 36 of the second part 32 which surface is in a mode where the end part is bent upward, and thereby, smooth undulations are formed on the entire chute surface which the granular articles flow down.

Herein, in the chute 3 according to the embodiment, the joint planes 35a to 35c are formed such that their slopes are less than 90 degrees when they are disposed in the optical sorting machine.

FIG. 4 is an enlarged view of the A part in FIG. 3 and shows movements of the granular articles between the plurality of flat surfaces 34a and 34b.

As shown in FIG. 4, according to the chute 3 of the embodiment, the granular articles move from the first flat surface 34a positioning on the upstream side to the second flat surface 34b positioning on the downstream side with moderate impacts.

Therefore, according to the chute 3 of the embodiment, since the granular articles disperse due to the impacts in their movements between the flat surfaces 34a to 34c and 36 on the first part 31 and the second part 32, it can be prevented that the granular articles flow down the surface of the chute 3 in the state of overlapping with and/or being joined to one another, and as a result, unevenness of the flow of the granular articles on the chute surface can be prevented.

Moreover, in the chute 3 according to the embodiment, since the smooth undulations are formed on the surface which the granular articles flow down and the granular articles move between the flat surfaces 34a to 34c and 36 with moderate impacts, hops of the granular articles hardly arise on the chute surface.

Furthermore, in the chute 3 according to the embodiment, since the entire surface of the chute is composed of one component and the continuity of the component is maintained, deposition of powdery dusts does not arise on the chute surface.

The above-mentioned chute 3 according to the embodiment has been described, exemplified by the first part 31 having the three flat surfaces 34a to 34c, whereas the first part 31 only has to have two or more flat surfaces.

Moreover, in the above-mentioned chute 3 according to the embodiment, the plurality of flat surfaces do not have to be parallel to one another.

In the above-mentioned chute 3 according to the embodiment, the part for receiving the granular articles fed from the vibratory feeder 22 of the granular article feeding part 2 in the optical sorting machine 1 may have two or more of flat surfaces continuing via the joint plane.

In the chute 3 according to the embodiment, the part for receiving the granular articles may have a plurality of protruding parts on the flat surfaces.

In the chute 3 according to the embodiment, when the part for receiving the granular articles has two or more flat surfaces continuing via the joint plane or has a plurality of protruding parts on the flat surfaces, dispersion of the granular articles flowing down the chute surface becomes effective.

In the chute 3 according to the embodiment, the second part 32 may have a length enough to be able to stabilize the flow of the granular articles.

Furthermore, dimensions of the chute 3 according to the embodiment can be properly determined in consideration of circumstances such as the dimensions and processing capability of the optical sorting machine and the sizes and kind of the granular articles as a sorting target.

In addition, in the chute 3 according to the embodiment, the second part 32 has a flat surface, whereas it may have grooves with U shapes or V shapes which grooves are parallel to the direction of flow-down of the granular articles.

Another Embodiment According to the Present Invention

Figure 5:
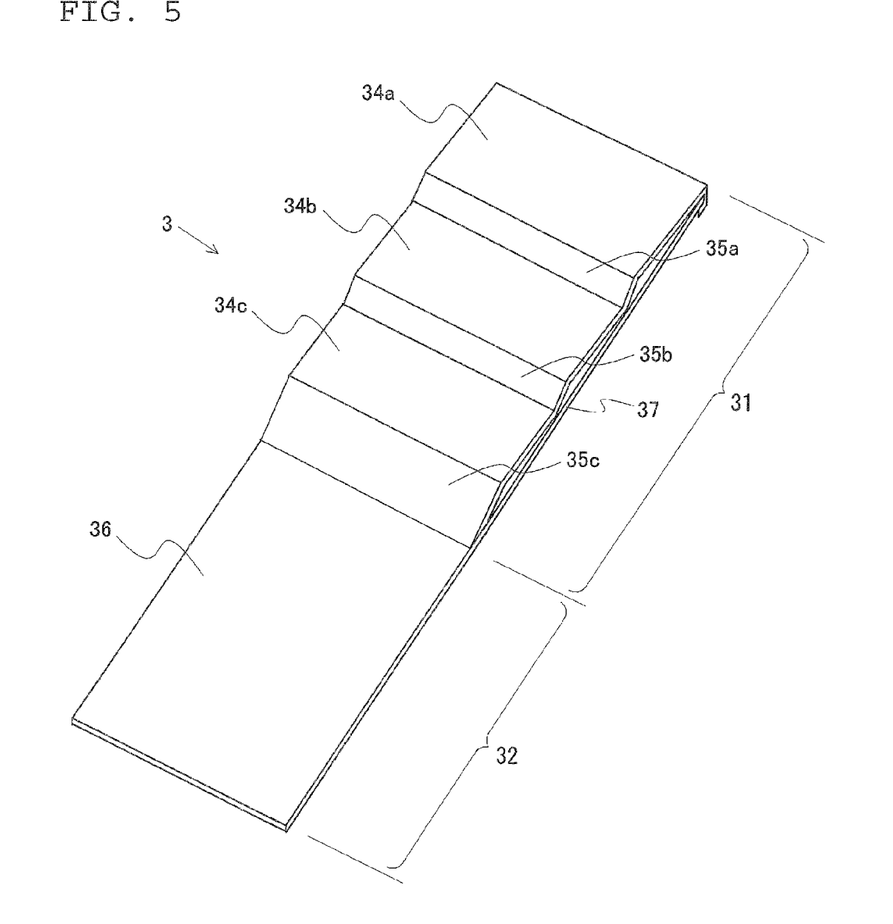
FIG. 5 is a schematic diagram of a chute according to another embodiment of the present invention.
Figure 6:
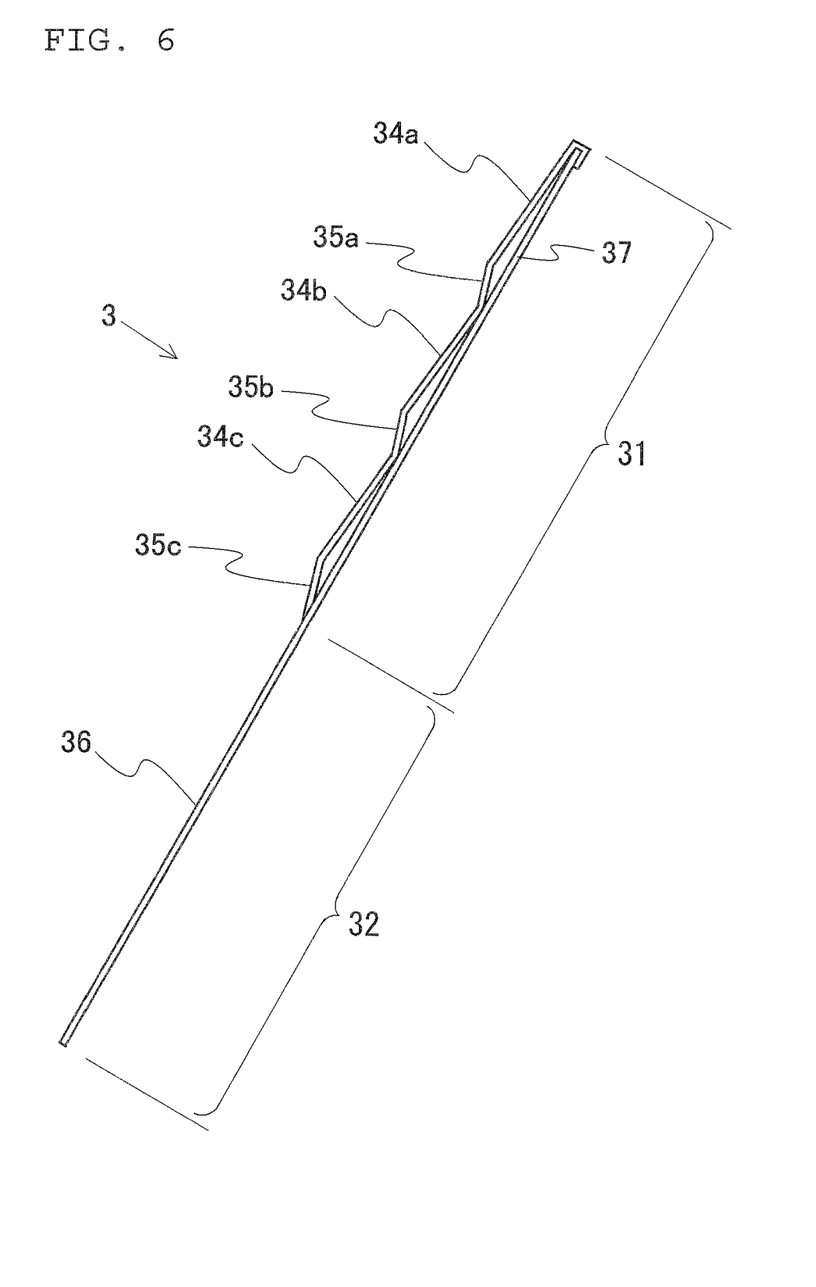
FIG. 6 is a lateral view of the chute in FIG. 5.

FIG. 5 shows a schematic diagram for explaining a chute according to another embodiment of the present invention. Moreover, FIG. 6 shows a lateral view of the chute shown in FIG. 5.

In the chute 3 according to the embodiment, the first part 31 for receiving the granular articles is composed of another component separate from the chute body 37 including the second part 32, and is detachably attached to the upper end of the chute body 37.

In the chute 3 according to the embodiment, the first part 31 has the same configuration as that of the first part 31 according to the embodiment that is shown in FIG. 2 and FIG. 3, and is attached to the chute body 37 such that the surface of the third joint plane 35c in the first part 31 is smoothly succeeded by the flat surface 36 in the second part 32.

Therefore, according to the chute 3 of the embodiment, the first part 31 can be properly modified according to the sizes, kind and the like of the granular articles.

In the chute 3 according to the embodiment, since the first part 31 is detachable, the first part 31 and the chute body 37 can be cleaned easily.

Moreover, in the chute 3 according to the embodiment, when the plural granular articles are granular articles such as short grain rice without a risk that they overlap with and/or are joined to one another, the first part 31 can be detached in the usage.

Moreover, regarding the chute 3 according to the embodiment, when the surface of the third joint plane 35c is smoothly succeeded by the flat surface 36 of the second part 32 without a step in attaching the first part 31 to the chute body 37, the granular articles can move between the surface 34c of the first part 31 and the surface 36 of the second part 32 with moderate impacts, and thus, hops of the granular articles and deposition of powdery dusts hardly arise.

It should be noted that the chute according to the present invention is not limited to the above-mentioned embodiments but modifications in configuration thereof may properly occur without departing from the scope of the present invention.

INDUSTRIAL APPLICABILITY

The chute according to the present invention is significantly useful because hops of granular articles and disposition of powdery dusts do not arise and unevenness of the flow of granular articles on the surface can be prevented.

LIST OF REFERENCE SIGNS

1 Optical sorting machine
2 Granular article feeding part
21 Raw material tank
22 Vibratory feeder
3 Chute
31 First part
32 Second part
33 Component
34a-34c Surfaces of first part
35a-35c Joint planes
36 Plane of second part
37 Chute body
4 Optical sorting part
42 Discriminating device
43 Ejector
44 Discharge hopper
6 Chute
61-64 Components
65 Powdery dusts

The invention claimed is:

1. A chute for an optical sorting machine, the chute: receiving a sorted article fed from a feeding part; allowing the received sorted article to flow down a surface; and after that, allowing the sorted article to undergo free fall from a lower end and to be fed to an optical detecting part, the chute comprising: a first part including a part for receiving the sorted article fed from the feeding part; and a second part succeeding the first part and allowing the sorted article to undergo free fall from the lower end, wherein
the first part is composed of one component, the first part has: a plurality of flat surfaces which the sorted article flows down; and a joint plane joining the plurality of flat surfaces at an obtuse angle in a direction in which the sorted article flows down, the joint plane is configured by bending the flat surface that positions on an upstream side downward and the flat surface that positions on a downstream side is configured by bending the joint plane upward, and thereby, a smooth undulation is formed on the surface which the sorted article flows down.

2. The chute according to claim 1, wherein
while having the joint plane at a lower end of the first part, the first part is detachably attached to a chute body including the second part and is smoothly succeeded by the second part via the joint plane included at the lower end by being attached to the chute body.

3. The chute according to claim 1, wherein
the first part and the second part are integrally formed of one component.

4. An optical sorting machine comprising: a chute: receiving a sorted article fed from a feeding part; and allowing the received sorted article to flow down a surface; optical detecting means for detecting the sorted article in free fall from a lower end of the chute at a predetermined detecting position; and ejector means for sorting out the sorted article on the basis of a detection result of the optical detecting means, wherein
 the chute includes: a first part including a part for receiving the sorted article fed from the feeding part; and a second part succeeding the first part and allowing the sorted article to undergo free fall from the lower end,
the first part is composed of one component, the first part has: a plurality of flat surfaces which the sorted article flows down; and a joint plane joining the plurality of flat surfaces at an obtuse angle in a direction in which the sorted article flows down, the joint plane is configured by bending the flat surface that positions on an upstream side downward and the flat surface that positions on a downstream side is configured by bending the joint plane upward, and thereby, a smooth undulation is formed on the surface which the sorted article flows down.

* * * * *